Sept. 14, 1937.   F. W. BAUM   2,092,869
THERMORESPONSIVE DEVICE FOR REGISTERING TEMPERATURES OF FLUIDS
Filed March 24, 1936
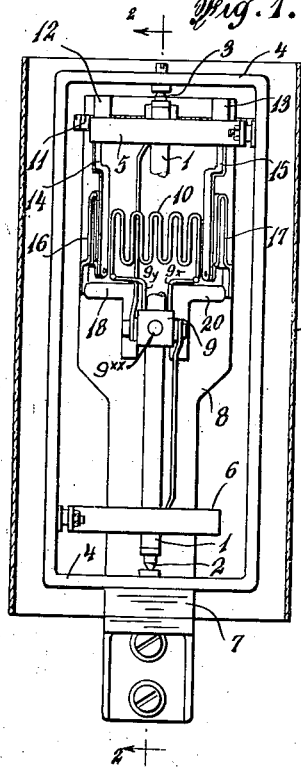
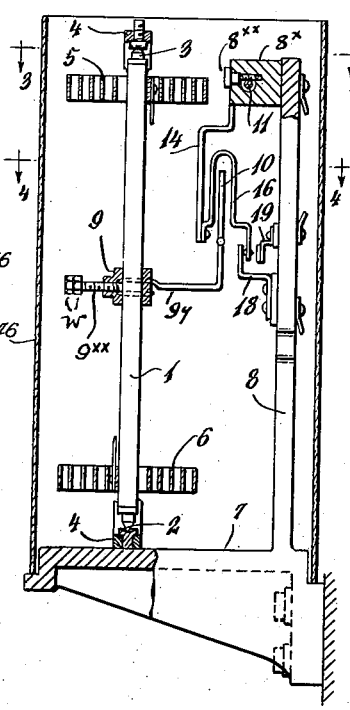
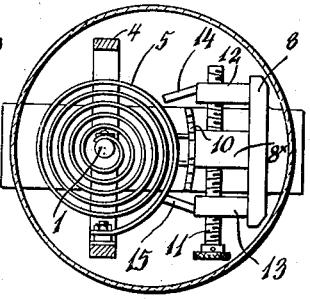
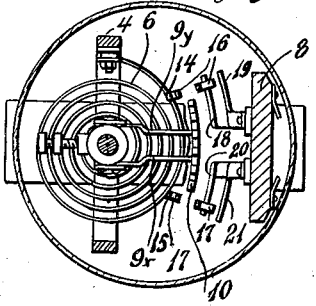
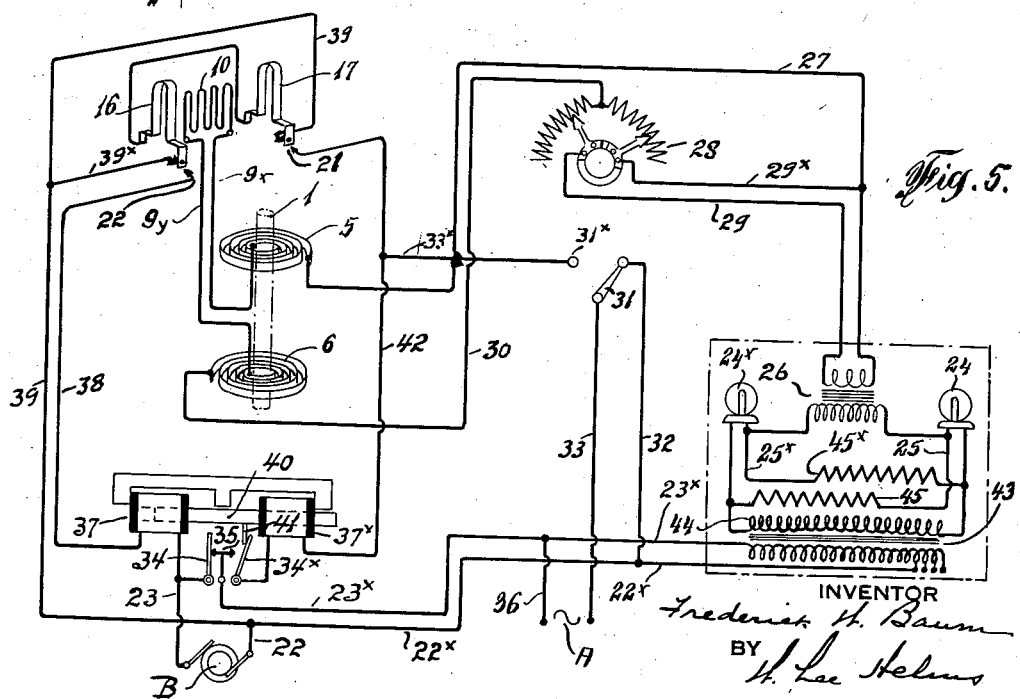
INVENTOR
Frederick W. Baum
BY
H. Lee Helms
ATTORNEY Patented Sept. 14, 1937

2,092,869

UNITED STATES PATENT OFFICE 2,092,869

THERMORESPONSIVE DEVICE FOR REGISTERING TEMPERATURES OF FLUIDS

Frederick W. Baum, St. George, Staten Island, N. Y., assignor of one-half to Pierre L. Caffier, Brooklyn, N. Y.

Application March 24, 1936, Serial No. 70,565

18 Claims. (Cl. 236—68)

This invention relates to a thermo-responsive device employing a new thermometric principle which registers quickly and accurately the varying temperatures of tenuous fluids such as ordinary air. This new thermometric principle can be adapted readily to measure, record and/or control temperatures of the air in which the device is disposed.

My invention is based upon the fact that if a constant electrical resistance, disposed in quiescent air, has a constant electrical current flowing through it, the resultant temperature of the resistance is a function of air temperature. A change in the temperature of the air will cause a relative change in the temperature of the resistance. The speed at which a change in air temperature effects a change in the resistance temperature varies directly with the difference between resistance and air temperatures. If the mass of the resistance is small, a difference of 100° F. between resistance and air temperatures will permit a change of 1° F. air temperature to effect approximately 1° F. change in resistance temperature within a few seconds' time, although a difference of 25° is sufficient for most occasions. In maintaining a small mass resistance at such a temperature, the power consumption is very small.

The invention provides an electrical resistance in the form of a temperature-responsive element such as a high electrical resistance bimetal spring. A constant electrical current is flowing continuously through the bimetal spring, the latter converting continuously the constant flow of electrical energy into heat energy, with the resulting temperature of the bimetal spring being used as a measure of air temperature.

The bimetal spring dissipates sufficient energy to maintain always a temperature substantially above that of the surrounding air, as the rapid operation of the device depends upon a high temperature bimetal spring radiating heat energy into substantially cooler adjacent air, as in contrast with known devices in which an auxiliary heater provides a hot air zone around the bimetal spring whereby there is practically no difference between the bimetal spring temperature and the surrounding air zone temperature.

The embodiment of the invention illustrated in the drawing is in the form of a temperature control system, for a firing motor for example, which not only provides apparatus capable of carrying the invention into effect, but embodies novel elements and combinations of elements for the purpose.

The invention will be described with reference to the accompanying drawing, in which Figure 1 is a front elevation of an embodiment of the invention with the casing therefor shown in section.

Figure 2 is a vertical section on the line 2—2, Figure 1, looking in the direction of the arrows.

Figure 3 is a horizontal section on the line 3—3, Figure 2.

Figure 4 is a horizontal section on the line 4—4, Figure 2.

Figure 5 is a diagrammatic view illustrating schematically the primary elements of the preceding figures and including a wiring diagram and certain voltage control, switch, and temperature-regulating elements applied thereto.

Referring to the drawing, I have shown at 1 an oscillatory shaft of insulating material, the ends of the shaft having needle-point bearings 2 and 3, each entering a socket member carried by rectangular frame 4 and thus permitting the shaft to freely oscillate within the frame.

Secured to shaft 1 near its upper end is the inner end of a bimetal spiral spring 5 wound clockwise, with the expanding metal on the outer surface, the spring having its outer end attached to frame 4. Secured to the lower part of shaft 1 is the inner end of a second bimetal spring 6 wound counter-clockwise, with the expanding metal on the inner surface. The outer end of spring 6 is secured to frame 4 at a side opposite from the side at which spring 5 is secured.

Before springs 5 and 6 are secured in position at their ends, each spring is placed under physical tension by relative movement of the ends thereof and subsequently eliminating oscillatory vibrations. By reason of the different relative placements of the expanding metal of the springs, one spring acts reversely to the second spring and inasmuch as one is wound clockwise and one counter-clockwise, they rotate in the same direction thereby permitting the two springs to be placed under physical tension without affecting their thermostatic operation.

At its base, frame 4 is secured to bracket 7. Extending upwardly from bracket 7 is an arm 8 which supports a plurality of electrical contact members which will later be described.

Mounted on shaft 1 at the central portion thereof, is a sleeve 9 which carries two electrical conductors $9x$ and $9y$ and a counterbalance $9xx$ for said conductors. Secured to and extending between said conductors is an electrical heating element 10. Arm 8 at its top carries a fixed block $8x$ having a transversely extending aperture which receives a right and left thread screw 11 which passes through the threaded apertures of two supports 12 and 13 to which are secured downwardly extending arms 14 and 15.

Secured to the lower end of arm 14 is a small bimetal switch member 16 with the expanding metal on its inner surface.

Secured to the lower end of arm 15 is a small bimetal switch member 17, similar to switch member 16.

Screw 11 is formed with a centrally disposed channel and a set screw 8xx, Fig. 2, is carried by block 8x and enters the channel of screw 11 to permit rotational movement only. The manual rotation of screw 11 causes the bimetal switch members 16 and 17 to be moved toward and away from each other.

Bimetal switch member 16 is provided at its lower end with opposed contact points, and the switch is normally in physical contact with electrical contact spring 18. When heating element 10 is in a definite heat relationship with bimetal switch 16, the bimetal expands and contact is broken with contact spring 18 and established with an electrical contact spring 19.

Bimetal switch member 17 has at its lower end opposed contact points, and normally is in contact with electrical contact spring 20. When heating element 10 is in a definite heat relationship with bimetal switch member 17 the bimetal expands and contact with spring 20 is broken, contact being established with electrical contact spring 21.

Referring to the diagrammatic view of Figure 5, the alternating current from the source of supply A flows through leads 33 and 36, and thence through leads 23x and 22x, with lead 33 having a series switch 31 and connecting lead 32. Leads 23x and 22x connect two parallel circuits, the right circuit entering a voltage regulator as indicated by boxed-in portion and comprising an input transformer 43 having a multi-tapped primary winding to accommodate different supply voltages, two ballast lamps 24 and 24x connected in series with the primary winding of step-down transformer 26 and thence across secondary winding of transformer 43, two resistances 45, 45x, preferably of carbon or other material having a negative temperature coefficient of resistivity, each of which is connected to furnish a shunt path from the line side of one ballast lamp to the load side of the other ballast lamp by connections through leads 25 and 25x respectively. Currents, in addition to the load circuit current, flow in the ballast lamps and through resistances 45 and 45x providing two shunt paths in which a constant voltage is maintained at points between each ballast lamp and its respective load-side resistance whereby the load circuit receives always a constant applied voltage. In an A. C. circuit, however, a single ballast lamp and a single resistor connected to a suitable tapped winding transformer will suffice. The load circuit is connected across the secondary of transformer 26 which may in practice operate to maintain a constant voltage of say 1½–2 volts as required.

*Operation of the voltage regulator*

In the conventional circuit consisting of a ballast lamp connected in series with the load, it can be readily observed that the load current, which is the same as that of the ballast lamp, must increase slightly to permit an increase in the resistance of the ballast lamp filament. It is then obvious that a load requiring an absolutely constant current cannot operate satisfactorily under these conditions. This voltage regulator is in reality a device which delivers a constant power to a useful load irrespective of voltage, frequency or power factor in an alternating current supply, as its regulating resistance variations are a function of power consumption since they are produced by the thermal or power changes in the ballast filament. The principle of operation can be reduced to two parallel circuits receiving different voltages from a common source of supply and having a ballast lamp common to both circuits, with the lower voltage circuit comprising the regulated load circuit and the higher voltage circuit controlling the voltage drop in the ballast lamp to the extent of producing 100% power regulation in the load circuit.

In the circuit shown in Figure 5, the current necessary to increase the resistance of the ballast lamp filaments is diverted through cross connected resistors, independent of the load circuit, permitting the load current to remain absolutely constant with a varying source of power supply. The resistors should preferably be of the carbon lamp type, this material having a negative temperature coefficient of resistivity. This would increase the power efficiency of the device. Suitable inductance coils having a variable magnetic reluctance and known commercially as "swinging chokes" may also be used to perform the same function.

It will be understood that a single ballast lamp with a double filament will serve the same function as the two ballast lamps 24, 24x, each with a single filament.

The constant current is led by wire 27 directly to bimetal spiral spring 5 and to bimetal spring 6 through the L-type pad attenuator 28 providing a temperature regulator via wires 29, 29x, and wire 30 with heating element 10 connecting the two springs together. By means of the temperature regulator the amount of electrical current flowing in the spiral springs may be regulated to any desired degree, as, for example, the current flowing in the spiral springs might produce a spring temperature of 97° F. when the air temperature is 72° F., and the maintenance of constant current is insured by the voltage regulator above described. The electrical energy transmitted to the spiral bimetal springs 5 and 6 will be constantly dissipated as heat radiation directed to the surrounding air.

In the position of the elements as shown in the said diagrammatic view, Figure 5, the manual switch arm 31 is left in the position illustrated while the device is in operation and it closes the circuits leading to both the right and the left, and as in the left circuit for example, a firing motor conventionally designated at B receives current from leads 23x and 22x with lead 22x connected directly to the motor by lead 22, and lead 23x connected to contact 35 of a relay switch, thence through switch arm 34 to lead 23.

Assuming that the controlled member B is a firing motor and that the temperature of the air surrounding the bimetal spiral springs 5 and 6 reaches a predetermined degree of satisfaction, the rotational movement of the springs will rotate shaft 1, and will carry electrical heating element 10 into such position relatively to bimetal switch member 16 as to cause the latter to close a circuit through solenoid 37 via leads 38, 39, and thence back to the source of supply. The actuation of solenoid 37 will draw its core 40 to the left from its position shown in Figure 5, causing finger 41 to throw switch arm 34 breaking the circuit to the controlled member B. A switch arm 34x will, like the first-named switch arm 34, have applied thereto spring means tending always to move the arm into engagement with contact member 35. Therefore, in the circuit-breaking movement of arm 34, arm 34x will be released and will engage contact member 35, thus placing lead wire 42 in condition to re-establish the circuit to the driven member immediately upon cooling of the air to a predetermined degree and thus causing rotational movement of the bimetal springs 5 and 6 to rotate shaft 1 in the opposite direction. This will cause the heating element 10 to move toward bimetal switch member 17, causing movement of the latter to a degree sufficient to engage contact 21. There is thus a normal circuit-closed position, while the heating element 10 remains in the position illustrated in Figure 5, a positive circuit-opening action when member 10 moves to the left a predetermined degree, and a positive circuit-closing action when the heating element is moved to the right a predetermined degree.

The movements of the heating element 10 to the left and to the right, are due to transitory variations from the normal transfer of heat from the bimetal coil springs 5 and 6 to the surrounding air, the movement to the left being caused by a transitory decrease in the radiation due to a raising of the temperature of the surrounding air beyond a predetermined degree. Thereupon, the circuit through the firing motor, if the apparatus controls a firing motor, is broken and remains broken until the temperature falls to a predetermined degree, thus rotational movement of the bimetal springs 5 and 6 with a consequent reversal of rotation of shaft 1, and the bringing of the heating element 10 into such position relatively to bimetal switch member 17 as to actuate the latter, energizing solenoid 37x which re-establishes the circuit, as shown in the diagrammatic view, Figure 5.

By means of the adjusting screw 11, bimetal switch members 16 and 17 may be so closely positioned that the apparatus is extremely sensitive and hence quick acting, being entirely adapted to act upon variations in temperature as low as 1° F. with no appreciable time lag. By adjusting bimetal switch members 16 and 17 in a direction away from each other, the sensitivity of the apparatus will be correspondingly decreased so that changes in room temperature within a desired degree may be had without effect upon the member controlled by the apparatus.

By reason of the fact that the bimetal spiral springs 5 and 6 are not used to mechanically throw switches or establish contacts, they have a freedom of rotation under all conditions. Therefore, long effective life of the bimetal springs without the necessity of adjustments thereof, is insured. It will be realized that in the usual operation of bimetal thermostatic springs, the latter throw switches or directly establish contacts by mechanical action with corresponding counter-mechanical pressure upon the springs and inevitable derangement thereof as to time and/or extent of action, particularly so when the bimetal springs might be varied to the extent of 100° F. in temperature.

When the device is not in use, manual switch arm 31 is thrown to the left from its position in Figure 5, transferring the input lead 33 to contact 31x and branch lead 33x. This will insure the operation of solenoid 37x to move contact arm 34x to the right and release contact arm 34 so that it is moved by its spring to the position of Figure 5.

With switch arm 31 thrown to the left, lead 22x is disconnected from supply lead 33 and both the voltage regulator circuit and the motor circuit are made inoperative.

Upon throwing manual switch arm 31 again to the right, motor B will always start immediately, irrespective of previous circuit operations performed by switch members 16, 17; and bimetal springs 6, 5 and heating element 10 will also become heated, with shaft 1 rotating counter-clockwise to a position conforming with the temperature of the surrounding air.

If the air temperature happens to be so low that heating element 10 does not reach switch member 17, the heating apparatus controlled by motor B is already in operation and will raise the air temperature until heating element 10 is placed in proper heat relationship with switch member 16, thus breaking the motor circuit when a predetermined air temperature is reached.

By employing at least two bimetal springs as shown in members 5 and 6, an electrical circuit is obtained through these moving elements without resorting to conventional slip-ring or pigtail connections as generally used with rotating or oscillating conductor members.

By employing bimetal switch members 16, 17, which are thrown into action by heating element 10, there is secured a high amplifying switch closing action by the metal springs 5 and 6. It will be realized that the effect of the heat transferred by heating element 10 to either one of the bimetal switch members 16, 17, increases in the ratio of the square of the distance traversed by the heating element 10. A secondary mechanical advantage is that a short lever connection between shaft 1 and heating element 10 is provided, hence making the device less subject to be affected by vibrations.

The weight of the heater may be counterpoised by weights W threaded on shaft 9x carried by sleeve 9.

An important element of the device is the provision of a chimney-like casing 46 through which natural convection of the surrounding air is obtained by the heat effect of the bimetal springs 5 and 6 and of the heating element 10. Any cross-convection currents in the room which would otherwise affect falsely the operation of the bimetal springs have no effect because they will simultaneously pass across the top and the bottom of the open casing. Thus the device is responsive only to the transitory general temperatures of the surrounding air.

It will be understood that any electrical conduction temperature responsive elements may be substituted for the bimetal springs 5 and 6, these being the preferred elements however. By reason of the circuit arrangement illustrated in Figure 5, one of the bimetal switch members 16, 17, must be expanded and the other contracted in order to operate the relay, and this will prevent any chattering of the relay.

Having described my invention, what I claim and desire to secure by Letters Patent, is as follows:—

1. In a thermo-responsive device operative upon variations in the temperatures of a fluid to throw into action an electrical control for a device, a thermostatic element comprising a bimetal spring, an electrical circuit including said bimetal spring, an electric circuit for a device to be thermostatically controlled, a heat responsive switch for making and breaking said second circuit, a heating element connected with said bimetal spring for actuation thereby, said heating element being movable relatively to the heat responsive switch in accordance with the movements of the bimetal spring.

2. In a thermo-responsive device operative upon variations in the temperatures of a fluid to throw into action an electrical control for a device, a thermostatic element comprising a bimetal spring, an electrical circuit including said bimetal spring, an electric circuit for a device to be thermostatically controlled, a heat responsive switch for making and breaking said second circuit, a heating element connected to and actuated by said bimetal spring and movable relatively to the heat responsive switch in accordance with movements of the bimetal spring, the heating element comprising a current conductor in the electric circuit with the bimetal spring.

3. In a thermo-responsive device operative upon variations in temperatures of a fluid throw into action an electrical control for a device, a shaft, two high electrical resistance bimetal springs physically tensioned on said shaft, an electric circuit including said bimetal springs, an electric circuit for a device to be thermostatically controlled, and a switch device for making and breaking said second circuit, said bimetal springs being operatively connected with the switch device.

4. In a thermo-responsive device operative upon variations in temperatures of a fluid to throw into action an electric control for a device, a thermostatic element comprising a bimetal spring, an electrical circuit including said bimetal spring, an electric circuit for a device to be thermostatically controlled, a switch device for making and breaking said circuit and comprising a bimetal spring, a second bimetal spring and a heating element operatively connected with the first bimetal spring, whereby the movements of the latter impart movements of the heating element relatively to the second bimetal spring.

5. In a thermo-responsive device for registering temperatures of a fluid, a thermostatic element comprising a bimetal spring, an electrical circuit including said bimetal spring, an electric circuit for a device to be thermostatically controlled, a double-acting relay switch for making and breaking said second circuit including two magnetic actuators, two heat responsive switches, each electrically connected to one of said magnetic actuators, and a heating element connected to said bimetal spring and adapted for actuation thereby toward and from each of said heat responsive switches.

6. In a thermo-responsive device operative upon variations in temperatures of a fluid to throw into action an electric control for a device, a thermostatic element comprising a high electrical resistance bimetal spring, an electrical circuit including said bimetal spring, an electric circuit for a device to be thermostatically controlled, a double-acting relay switch for making and breaking said second circuit including two magnetic actuators, two heat responsive switches, each electrically connected to one of said magnetic actuators, a heating element connected to said bimetal spring and adapted for actuation thereby toward and from each of said heat responsive switches, and means in said first circuit for maintaining a constant current to said bimetal spring.

7. In a thermo-responsive device operative upon variations in temperatures of a fluid to throw into action an electrical control for a device, a thermostatic element comprising two high electrical resistance bimetal springs, a shaft on which the bimetal springs are physically tensioned, an electric circuit including said bimetal springs, the latter being adapted for movement in response to a temperature change in a fluid surrounding the springs, a second electric circuit for a device to be thermostatically controlled, a thermo-responsive switch in said second circuit, and a heating element in the first circuit and operatively connected to said shaft for actuation thereby, in accordance with movements of said bimetal springs.

8. In a thermo-responsive device operative upon variations in temperatures of a fluid to throw into action an electric control for a device, a thermostatic element comprising a bimetal spring, an electric circuit for a device to be thermostatically controlled, a switch device for making and breaking said second circuit, and means for operating said switch device by movements of said bimetal spring without physical contact of the latter with any member of the switch device, comprising a heating element operatively connected with said bimetal spring for movement relatively to the heat responsive switch device.

9. In a thermo-responsive device operative upon variations in temperatures of a fluid to throw into action an electric control for a device, a thermostatic element comprising a bimetal spring, one end of the spring being fixed, a first electric circuit including said bimetal spring, an electrical heating element adapted to be moved by the opposite end of said spring and included in said circuit, a second electric circuit for a device to be controlled, a thermo-responsive switch in said second circuit and adapted for response by the movements of said heating element relatively thereto, and a constant voltage regulator controlling the flow of current to said first circuit.

10. In a thermo-responsive device operative upon variations in temperatures of a fluid to throw into action an electric control for a device, an electric circuit, a thermo-responsive switch in said electric circuit, an electrical heating element, and a bimetal spring operatively connected to said heating element and adapted to respond to temperature changes in said fluid by moving the heating element relatively to the thermo-responsive switch to effect actuation thereof, a device in said circuit adapted to be actuated upon operation of said switch.

11. A thermo-responsive device comprising a temperature responsive element adapted to move and carry an electrical current, said temperature responsive element consisting of at least two bimetal springs having fixed ends constituting two stationary electrical terminals and having free ends for movement, an electrical circuit through said springs, and a secondary device operatively connected to said temperature responsive element for actuation and control by movement of said free ends of the springs.

12. In a thermo-responsive device reactive upon changes in temperatures of a tenuous fluid, a high electrical resistance thermostatic element and means for heating said element by constant electrical current flowing therethrough and causing electrical energy to be dissipated by said element in the form of heat, a secondary device operably connected to said thermostatic element for actuation and control thereby upon changes in the temperature of the fluid, said thermostatic element being adapted to generate and continually radiate a constant amount of heat energy into said fluid, whereby said thermostatic element maintains itself at temperatures relative to but substantially above the temperatures of the fluid and the resulting temperatures maintained by said thermostatic element are used as a measure of the fluid temperatures in the actuation of said secondary device.

13. In a thermo-responsive device reactive upon changes in temperatures of a tenuous fluid, a temperature responsive self-contained electrical heating element, a device operably connected to said thermostatic element for actuation and control thereby upon changes in the temperature of the fluid, said element being adapted to generate and continuously radiate heat energy into said fluid, and means for passing a constant electric current through said element whereby the latter maintains itself at higher temperatures than the temperatures of the fluid in which it is disposed.

14. A thermo-responsive device reactive upon changes in temperatures of a tenuous fluid, comprising a thermostatic element of high electrical resistance, means for passing a constant electrical current through said thermostatic element whereby said thermostatic element maintains itself at temperatures substantially above the temperatures of the surrounding fluid by the dissipation of electrical energy and a device operably connected to said thermostatic element for actuation and control thereby but upon changes in the temperature of the fluid, said thermostatic device having instant inherent actuation upon variations in the fluid temperature because of transitory variations in rate of heat radiation from said thermostatic element into said fluid.

15. In a thermo-responsive device reactive upon changes in the temperature of a tenuous fluid, a thermostatic element of high electrical resistance, a secondary device operatively connected to said thermo-responsive element for actuation and control thereby, means for passing an electrical current through said element and causing electrical energy to be dissipated by said element in the form of heat, and means for varying the amounts of electrical energy dissipated by the thermostatic element to control the temperature range in which said secondary device is actuated.

16. In a thermo-responsive device reactive upon changes in temperatures of a tenuous fluid, a thermostatic element, a device operably connected to said thermostatic element for actuation and control thereby upon changes in the temperature of the fluid, said thermostatic element being adapted to generate and continuously radiate heat energy into said fluid, and means for leading an electrical current to said thermostatic element whereby the latter maintains itself at temperatures relative to but substantially above the temperatures of the fluid.

17. A thermo-responsive device reactive upon changes in temperatures of a tenuous fluid, comprising a thermostatic device in the form of a self-contained electrical heating element, a device operably connected to said thermostatic element for actuation and control thereby, upon changes in the temperature of the fluid, said thermostatic element being adapted to generate and continually radiate heat energy into said fluid at temperatures relative to but substantially above the temperatures of the fluid, and means for passing a constant electric current through said element whereby said element maintains itself at temperatures substantially above the temperatures of said fluid, and variations of the fluid temperatures increase or decrease temporarily the amount of heat radiated by said thermostatic element, causing said element to immediately assume a new temperature at which the element continues the radiation of a constant amount of heat energy.

18. In a thermo-responsive device operative upon variations in temperatures of a fluid to throw into action an electric control for a device, a thermostatic element comprising a high electrical resistance bimetal spring, an electric circuit to be thermostatically controlled, an electrical heating element, a thermo-responsive switch device for making and breaking said circuit, means for operating said thermo-responsive switch device by movements of said electrical heating element, the latter being positively connected to said bimetal spring, and means for maintaining constant current through said high electrical resistance bimetal spring and said heating element.

FREDERICK W. BAUM.